June 14, 1938. M. J. FRANCIS 2,120,892
TELESCOPE SUN VISOR
Filed May 5, 1937
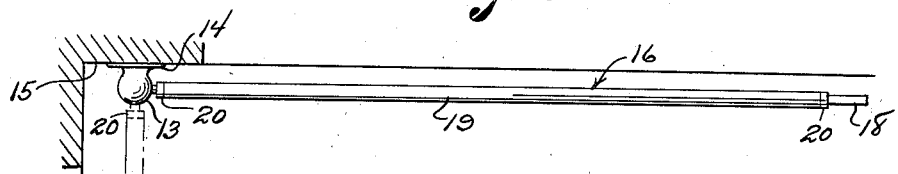
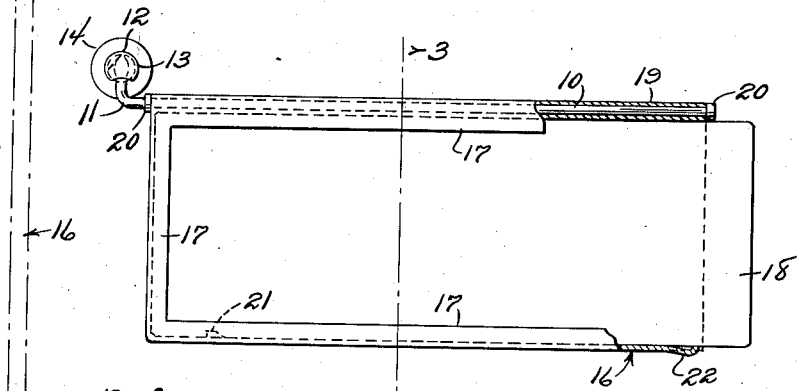
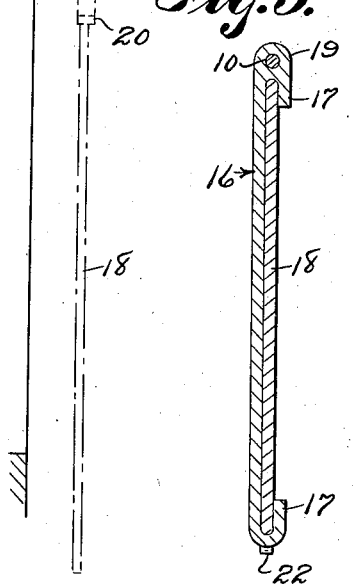
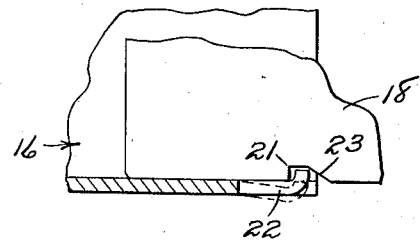
Merlin J. Francis
INVENTOR
BY Victor J. Evans & Co.
ATTORNEYS Patented June 14, 1938

2,120,892

UNITED STATES PATENT OFFICE 2,120,892

TELESCOPE SUN VISOR

Merlin J. Francis, Evansville, Wis.

Application May 5, 1937, Serial No. 140,924

1 Claim. (Cl. 296—97)

This invention relates to sun visors for motor vehicles and has for an object to provide an extensible sun visor which may be extended longitudinally to provide greater protection for the driver than present sun visors.

A further object is to provide a sun visor including a visor carrying arm mounted to swing angularly in a horizontal plane, and upon this arm the extensible visor is mounted to swing angularly in a vertical plane so that in the contracted position the visor may be used before the windshield, or the arm may be swung backward paralleling the back door and the visor extended to provide a continuous side shade over the latter.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a horizontal sectional view through a part of the body of an automobile at the left front side thereof and showing the same equipped with a sun visor constructed in accordance with the invention.

Figure 2 is a front elevation of the visor in contracted position.

Figure 3 is a vertical section of the visor taken on the line 3—3 of Figure 2.

Figure 4 is a detail sectional view of the visor in extended position.

Referring now to the drawing in which like characters of reference designate similar parts in the various views, 10 designates an arm which is mounted to swing angularly in a horizontal plane and to attain this end the arm is turned upwardly at one end as shown at 11 and provided with a ball 12 which is received in a socket 13 having a base plate 14 which may be fixed to the inside of the windshield post 15 at the left front side of the car above the windshield.

The extensible windshield comprises a substantially rectangular plate 16 having an integral substantially rectangular frame 17 on one side forming a retaining frame and guide for a substantially rectangular plate 18 which is thus telescopically assembled with the plate 16 to be extended outwardly and contracted inwardly relatively to said plate 16.

A tube 19 is formed integral with the top longitudinal edge of the plate 16 and is sleeved on the arm 10. A pair of stop collars 20 are secured to the arm and bear against the ends of the tube to prevent dislodgment of the tube from the arm. The arm 10 forms an axis of rotation upon which the visor may swing angularly in a vertical plane. The bottom edge of the plate 18 is provided with a notch 21, best shown in Figure 4, which receives a spring keeper 22 in the nature of a hook which is struck from the material of the bottom of the plate 16. One edge of the notch is inclined obliquely upwardly and toward the rear edge of the plate 18 to provide a cam surface 23 which cams out the keeper 22 when the plate 18 is being moved to contracted position with respect to the plate 16.

In operation the visor may be used in contracted position before the windshield and may be extended to provide greater protection for the driver when necessary by pulling out the plate 18 until the keeper 22 engages in the notch 21. Also the arm 10 may be swung backward paralleling the left door and the visor may then be extended by pulling out the plate 18 to provide a continuous side shade over the door.

From the above description it is thought that the construction and operation of the invention will be fully understood without further explanation.

What is claimed is:

A visor for motor vehicles comprising an elongated rod, means at one end of said rod for supporting said rod for swinging movement, a visor member, means carried by a longitudinal edge of said member engaging said rod to swingably support said member on said rod, opposed guide members carried by the longitudinal edges of said visor member, a second visor member slidable longitudinally of said guide members, a spring-pressed latch carried by said first visor member, said second visor member having a notch to receive said latch for holding said second visor member in extended position.

MERLIN J. FRANCIS.